(12) United States Patent
Mader et al.

(10) Patent No.: US 9,555,605 B2
(45) Date of Patent: Jan. 31, 2017

(54) DEVICE FOR LAMINATING PLATE-SHAPED ARTICLES

(71) Applicant: LISEC AUSTRIA GMBH, Seitenstetten (AT)

(72) Inventors: Leopold Mader, Neuhofen/Ybbs (AT); Richard Bruckner, Ferschnitz (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 24 days.

(21) Appl. No.: 14/437,320

(22) PCT Filed: Oct. 14, 2013

(86) PCT No.: PCT/AT2013/000171
§ 371 (c)(1),
(2) Date: Apr. 21, 2015

(87) PCT Pub. No.: WO2014/063174
PCT Pub. Date: May 1, 2014

(65) Prior Publication Data
US 2015/0273807 A1    Oct. 1, 2015

(30) Foreign Application Priority Data

Oct. 22, 2012    (AT) ................................ A 1138/2012

(51) Int. Cl.
*B32B 37/10* (2006.01)
*B32B 37/00* (2006.01)
(Continued)

(52) U.S. Cl.
CPC ..... *B32B 37/0053* (2013.01); *B32B 17/10862* (2013.01); *B32B 37/18* (2013.01); *B32B 38/1841* (2013.01)

(58) Field of Classification Search
CPC ....................... B32B 17/10862; B32B 37/0053
(Continued)

(56) References Cited

U.S. PATENT DOCUMENTS 3,730,079 A    5/1973    Stirk et al.
4,696,713 A    9/1987    Okafuji et al.
(Continued)

FOREIGN PATENT DOCUMENTS

DE    34 24 802 A1    1/1985
DE    34 20 409 A1    12/1985
(Continued)

OTHER PUBLICATIONS

International Search Report, dated Jan. 28, 2014, from corresponding PCT application.
(Continued)

*Primary Examiner* — Philip Tucker
*Assistant Examiner* — Jimmy R Smith, Jr.
(74) *Attorney, Agent, or Firm* — Young & Thompson

(57) ABSTRACT

A device for laminating plate-shaped articles, in particular glass panes, has two laminating rolls (2, 9), of which at least one laminating roll (2) is driven and between which the plate-shaped articles for laminating are guided through. One laminating roll (2) is preferably mounted fixedly in a machine frame (1) and the other laminating roll (9) is mounted adjustably in the machine frame (1). The roll (9) which is mounted adjustably in the machine frame (1) is mounted in the region of the ends of the roll (9) in bearings (11) which are connected to parallel links (25, 26). The parallel links (25, 26) are mounted in the machine frame (1) and are connected to one another via a coupling rod (32). One of the two parallel links (25) is connected to a drive (37).

16 Claims, 5 Drawing Sheets

Figure 1:
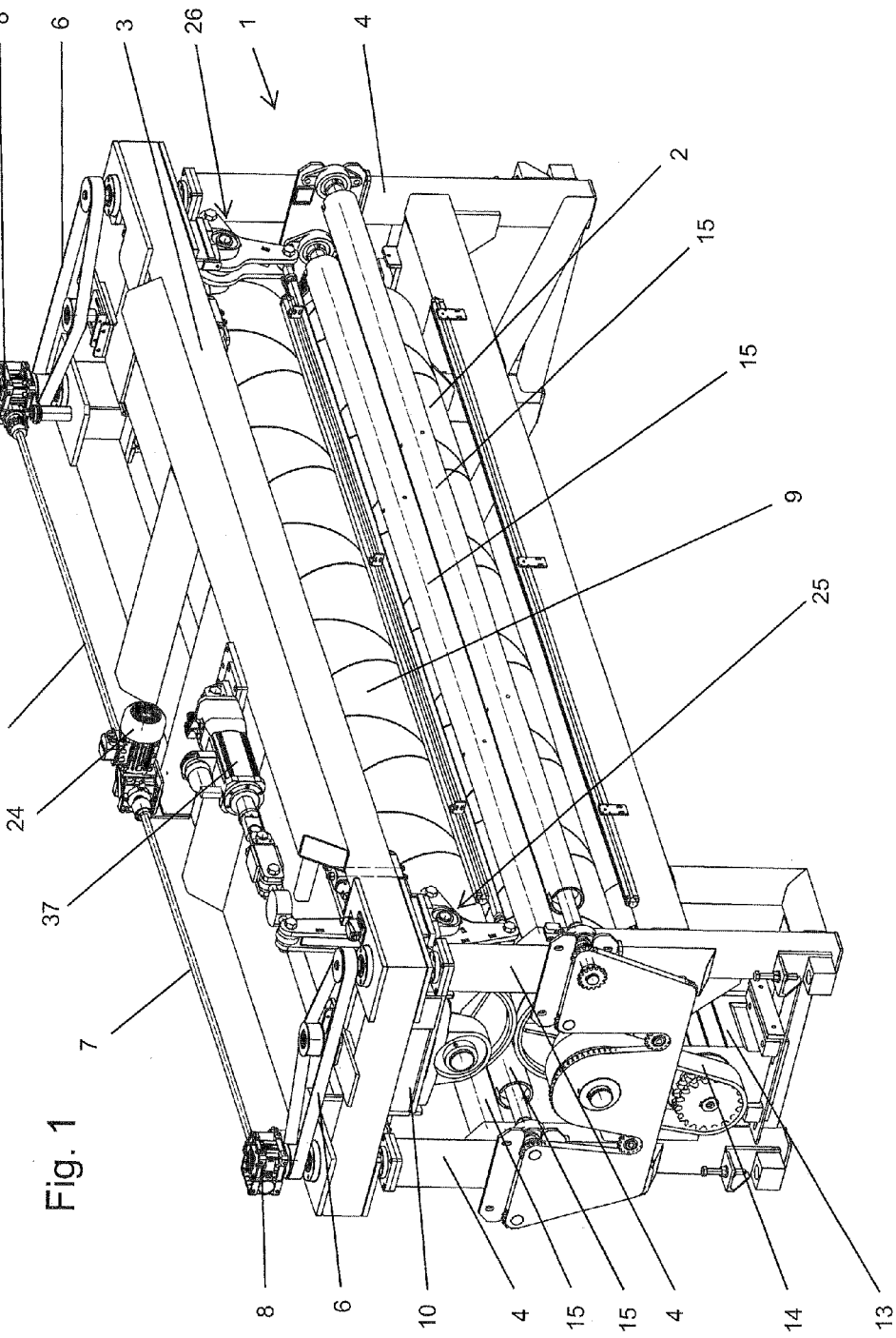

(51) Int. Cl.
  *B32B 17/10*  (2006.01)
  *B32B 37/18*  (2006.01)
  *B32B 38/18*  (2006.01)

(58) Field of Classification Search
  USPC ..................................... 156/582, 583.8, 103
  See application file for complete search history.

(56) References Cited

U.S. PATENT DOCUMENTS 5,167,757 A     12/1992  Didelot et al.
5,305,689 A  *  4/1994   Schiel ................... D21F 3/0218
                                              100/162 B

FOREIGN PATENT DOCUMENTS

| DE | 69 11 4154 T2 | 6/1996 |
| EP | 2 433 791 A1 | 3/2012 |
| EP | 2 433 792 A1 | 3/2012 |

OTHER PUBLICATIONS

AT Search Report, dated Aug. 30, 2013, from corresponding AT application.

* cited by examiner

DEVICE FOR LAMINATING PLATE-SHAPED ARTICLES

The invention relates to a device for laminating plate-shaped articles, in particular glass panes, with two laminating rolls, from which at least one laminating roll is driven and between which the plate-shaped articles for lamination are guided, whereby a laminating roll is preferably mounted securely in a machine frame, and the other laminating roll is mounted in an adjustable manner in the machine frame.

This invention is explained based on glass panes; however, it is not limited to the latter. Rather, it can also be used during lamination of other plate-shaped articles.

In the production of glass panes, e.g., laminated glass panels, flexibilization is increasingly expected with regard to not only different glass thicknesses and sizes but also special shapes, which deviate from a simple rectangular shape and have oblique or curved edges.

Accordingly, the glass panes alternately also do not always traverse the same site and in the same width as well as the same thickness through the gap between the laminating rolls. This makes it difficult to always adjust the pressure of the laminating rolls correctly.

A device for lamination, which has the features of the introductory part of the independent Claim, is known from EP 2 433 791 A1. In the case of the device of EP 2 433 791 A1, the pivoting frame, in which the upper adjustable roll is mounted, is adjusted using two spindle drives relative to the lower roll in order to set the gap width between the rolls. The spindle drives are coupled to one another by a shaft, whereby a single drive motor is provided. Pneumatic springs are provided between the spindle drives and the bearings of the adjustable rolls. By selecting the pressure with which these springs are loaded, the pressure that the rolls exert on the glass that is to be laminated is set.

The object of the invention is to make available a device of the above-mentioned type, which makes possible a uniform distribution of force over the entire width of the laminating rolls.

This object is achieved with a device of the above-mentioned type in that the roll that is mounted in an adjustable manner in the machine frame is mounted in the area of its ends in bearings that are connected to parallel guides, in that the parallel guides are mounted in the machine frame and are connected to one another by means of a coupling bar, and in that one of the two parallel guides is connected to a drive.

Because of the parallel guides that are connected to the coupling bar, of which guides only one is driven, the adjustment of the adjustable laminating rolls is done constantly over the entire width of the laminating rolls. Also, the compressive force is constantly applied over the entire width of the laminating rolls. This is independent of whether the respective section of a glass pane is moved directly through the pressing gap.

A very compact design is produced when the parallel guides have two legs, of which the respective first leg is connected to the coupling bar and the respective second leg is connected to the bearing for the laminating roll. In this case, it is especially advantageous when the two legs extend toward one another approximately at right angles.

In the invention, it is preferred when the adjustable laminating roll is mounted on the machine frame in a pivoting frame. This produces an especially rigid design.

Preferred embodiments of the invention are subjects of the subclaims.

Figure 2:
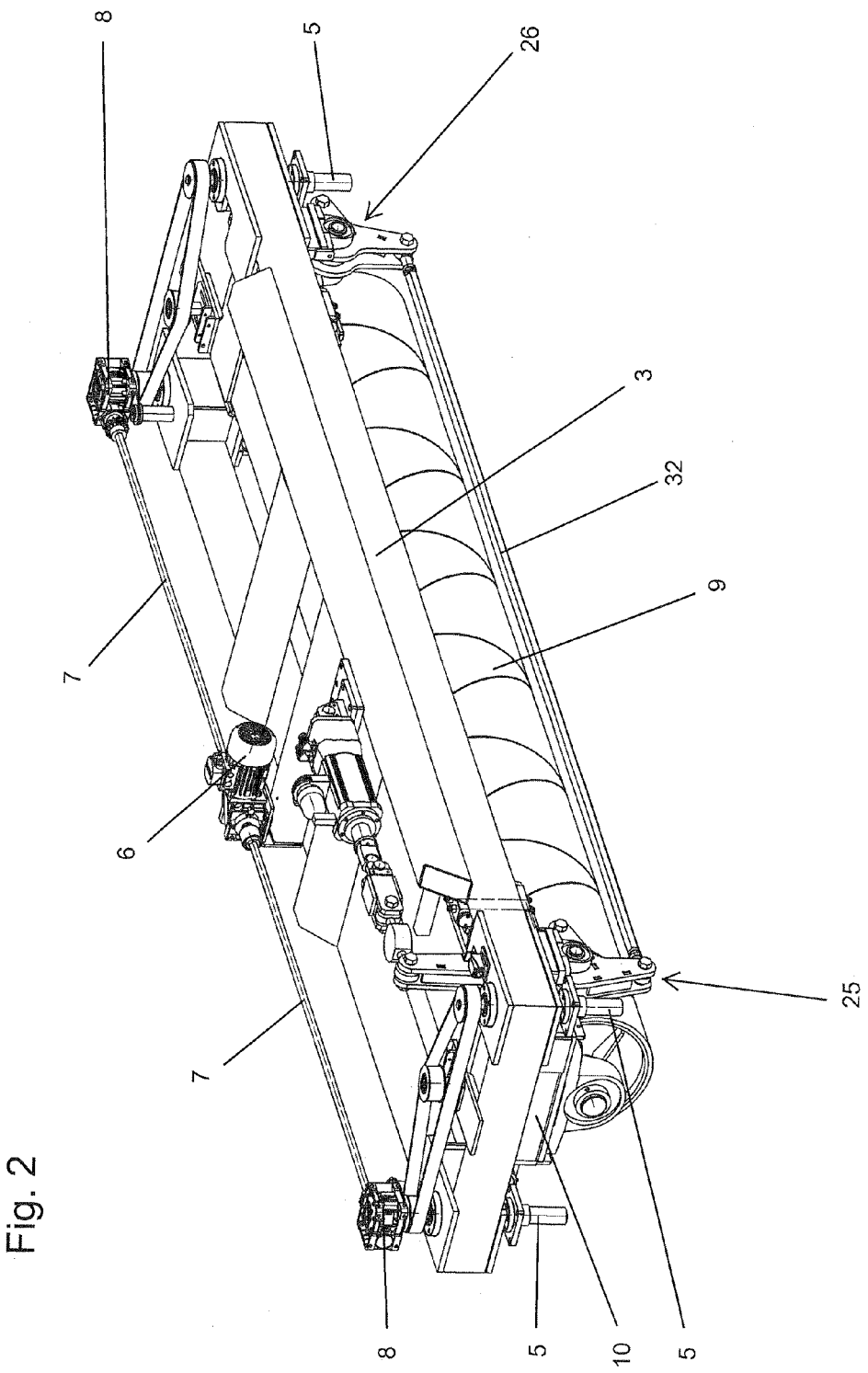
Figure 3:
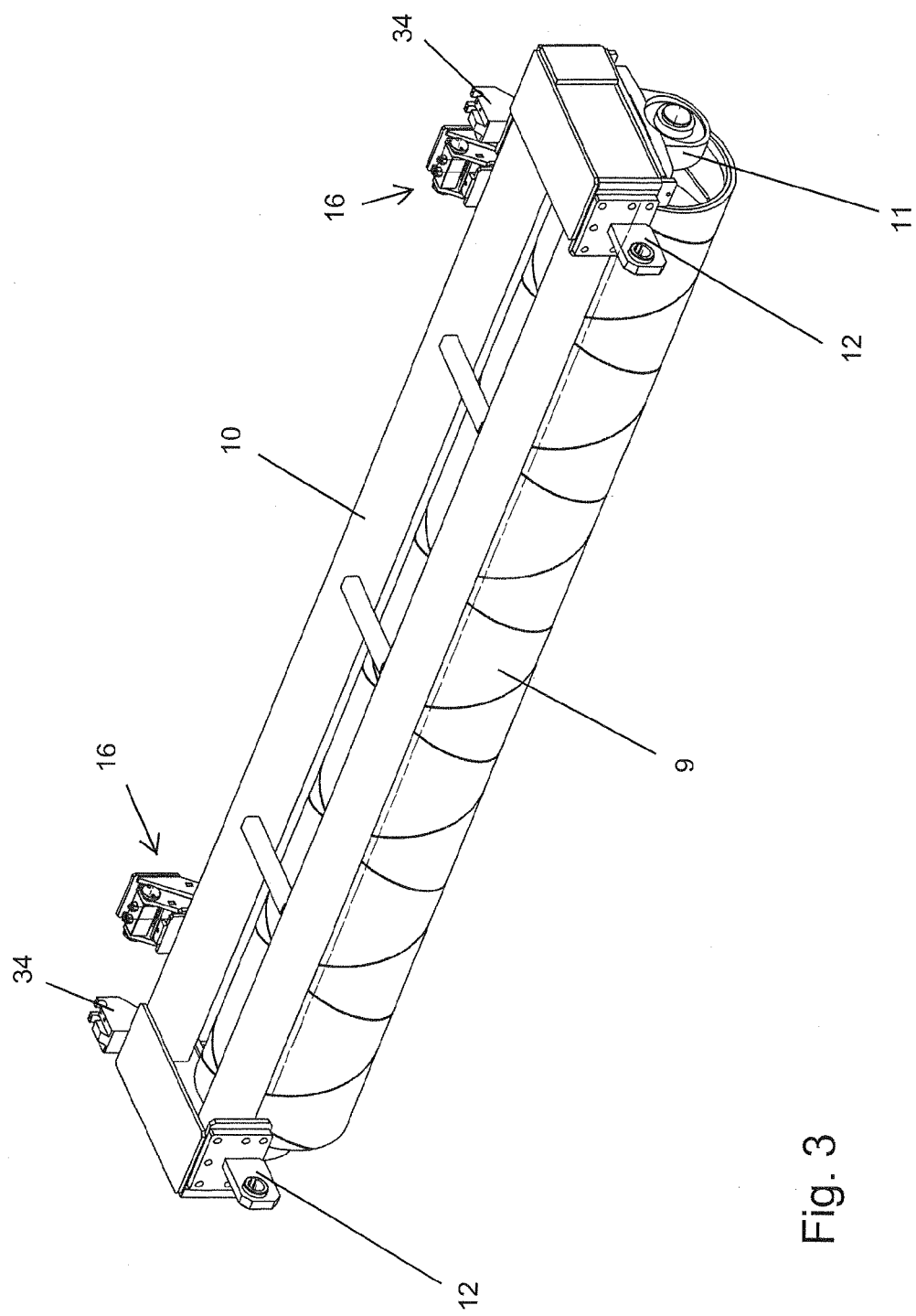
Figure 4:
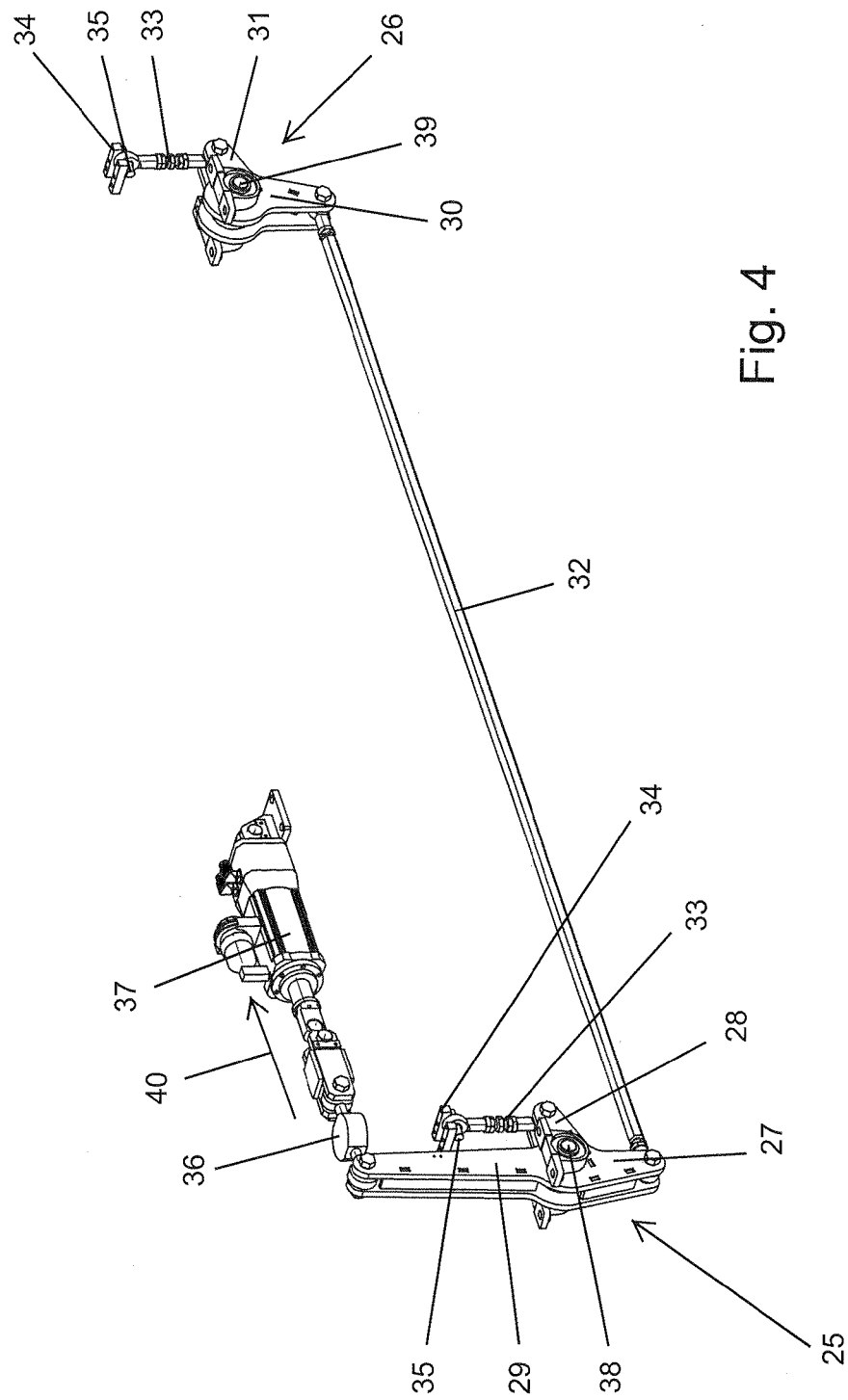
Figure 5:
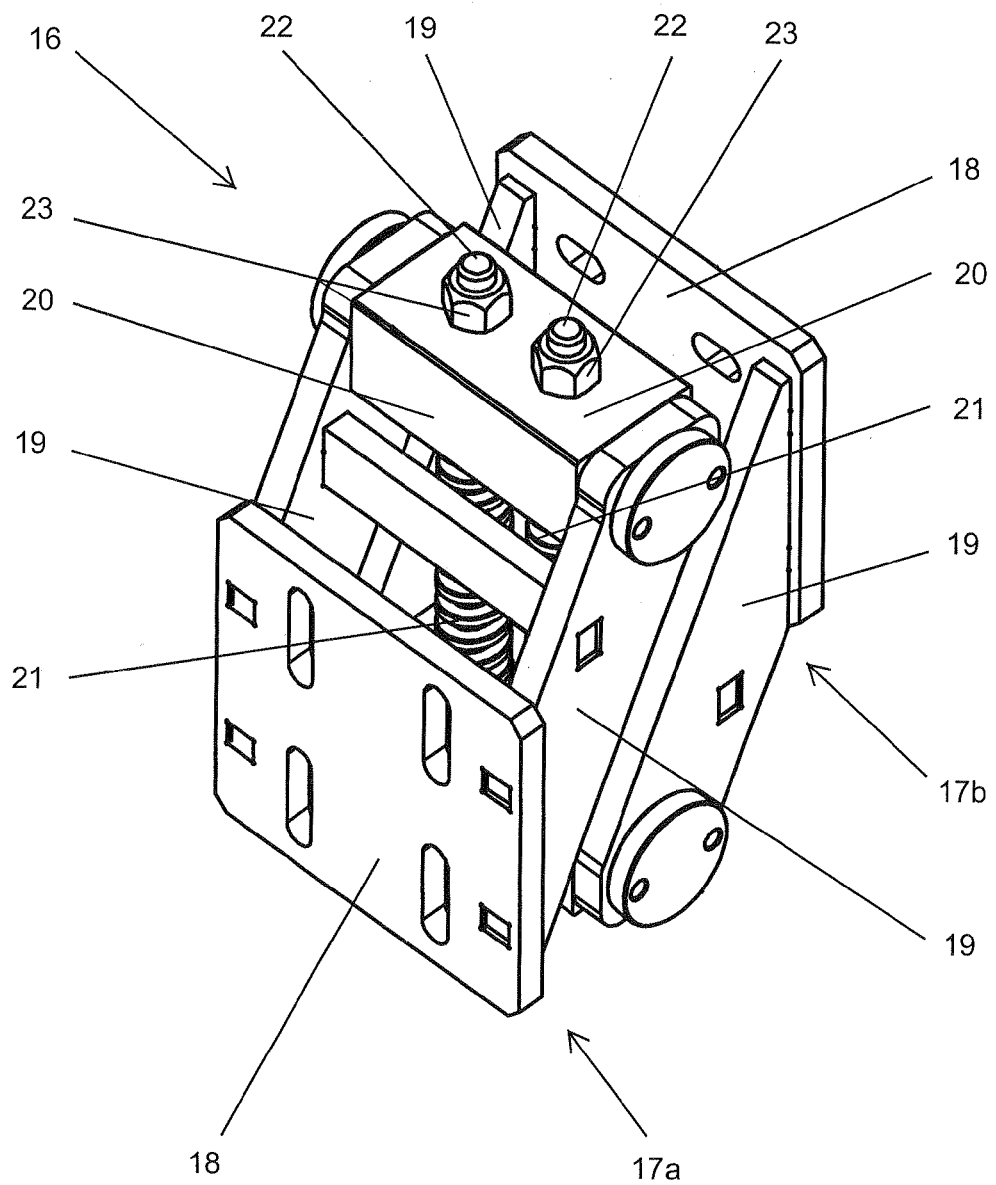

Additional features and advantages of the invention follow from the subsequent description of a preferred embodiment of the invention with reference to the attached drawings. Here:

FIG. 1 shows a device according to the invention for laminating plate-shaped articles, in particular glass panes, in an oblique cutaway view, FIG. 2 shows a supporting frame, on which a pivoting frame of the device is mounted, FIG. 3 shows a pivoting frame, on which a laminating roll is mounted, FIG. 4 shows a drive for pivoting the pivoting frame, and FIG. 5 shows a detail of the mounting of the pivoting frame.

In FIG. 1, a device according to the invention for laminating plate-shaped articles, in particular glass panes, is depicted in an oblique cutaway view, which has a machine frame 1, in which a lower laminating roll 2 is mounted so as to rotate in an essentially stationary manner. The machine frame 1 has a supporting frame 3, which is mounted in a height-adjustable manner on four supports 4 of the machine frame 1 over spindles 5. The spindles 5 are uniformly driven in pairs over toothed belts 6, specifically by an electric motor 24 with two shafts 7 and two gears 8. By rotating the motor 24 in one or the other direction, the supporting frame 3 can be adjusted in its height relative to the supports 4 in order to be able to set the width of the roll gap between the lower laminating roll 2 and an upper laminating roll 9.

The upper laminating roll 9 is mounted so as to rotate in the bearings 11 on a pivoting frame 10. The pivoting frame 10 is pivotably mounted in the depicted embodiment and is adjustable via pivot bearings 12 formed by bearing flanges on the supporting frame 3. Receptacles, not shown, for the bearing flange of the pivot bearing 12 are arranged in the supporting frame 3, which pivot bearings receive bearing bolts that are mounted in the pivot bearings 12. The bearing bolts therefore form secure pivot axes for the pivoting frame 10 in the supporting frame 3.

The lower laminating roll 2 is driven by a motor 13 with a toothed belt 14. The upper laminating roll 9 can also be driven in a rotating manner. In the direction of traverse of the articles that are to be laminated in front of and behind the lower laminating roll 2, supporting rolls 15 are arranged, which rolls support from below the plate-shaped articles that are to be laminated.

On the side opposite to the bearing flanges of the pivot bearing 12, holding devices 16 are arranged, which devices are fastened, on the one hand, to pivoting frame 10 and, on the other hand, to the supporting frame 3. The holding devices 16 in each case have two mounting units 17a, 17b that are designed essentially the same but directed against one another, with mounting plates 18 and legs 19. On the free ends of the leg 19, blocks 20 are mounted so as to rotate, between which two compression springs 21 are stretched. The blocks 20, and with the latter the mounting units 17a, 17b, are held together by means of screws 22, which are guided by the compression springs 21 and thus simultaneously prevent a dislodging of the compression springs 21. The prestressing of the compression springs 21 can be set with screw nuts 23. Mounting via tension springs and/or in any other form of holding device is also taken into consideration within the scope of the invention.

The mounting unit 17a of the two holding devices 16 is bolted onto the pivoting frame 10 by means of the mounting plate 18, and the mounting unit 17b of the two holding devices 16 is bolted onto the supporting frame 3 by means of the mounting plate 18. The preliminary stress force of the springs 21 is set in such a way that the net weight of the pivoting frame 10 is preferably completely taken up with the upper laminating roll 9 and the other machine parts that are mounted on the pivoting frame 10. It is also possible to specifically overcompensate or undercompensate for the net weight.

In order to produce the pressing power of the upper laminating roll 9 on the lower laminating roll 2 or the glass panes that are guided in between, two parallel guides 25, 26 are provided. In the depicted embodiment, the parallel guide 25 has three legs 27, 28, 29 and the other parallel guide 26 has two legs 30, 31. The first, lower legs 27, 30 of the parallel guides 25, 25 are connected to one another via a coupling bar 32, which is designed as a tension bar in the depicted embodiment. The second legs 28, 31 of the parallel guides 25, 26 that project approximately at right angles therefrom are hinged via connecting elements 33, tension elements in the depicted embodiment, with receptacles 34, which are provided on the pivoting frame 10, suspended in particular with bearing bolts 35 in U-shaped receptacles 34.

In the depicted embodiment, the third leg 29 of the one parallel guide 25 lies in a line with the first leg 27 and is connected via a force measuring system 36 to a drive 37. The drive 37 can be, for example, an electric drive, which pulls on the third leg 29 in the direction of the arrow 40. Since the parallel guides 25, 26 in the bearings 38, 39 are mounted on the supporting frame 3, the tensile force of the drive 37 is transferred via the coupling bar 32 to the two parallel guides 25, 26 and from the latter via the second leg 28, 31 and the connecting elements 33 uniformly to the pivoting frame 10 and from the latter to the upper laminating roll 9, which is pulled downward. An adequate rigidity of the upper and lower laminating rolls 2, 9 presumably can thus be applied over the entire width of the laminating rolls 2, 9 of the same pressing power. The compressive force can be acquired exactly with the force measuring system 36.

On the intake side of the device according to the invention, a device for acquiring the type, geometry and position of the articles that are to be laminated, such as, e.g., glass panes, can be arranged, by which calculations can be run as to how wide the section of the glass pane, located directly between the laminating rolls 2, 9, is so that apart from the fact that different types of articles can require different compressive forces, calculations can be run or it is known, also because of the current width of the article in the pressing gap, as to how great the compressive force ideally should be. Since the direct active force of the drive 37 that acts on the parallel guides 25, 26 by the force measuring system 36 is also known, it is possible to control or regulate the compressive force between the laminating rolls 2, 9 extremely precisely. The width of the pressing gap can be set via the motor 24 simultaneously based on the thickness of the articles that are to be laminated.

In summary, an embodiment of the invention can be described as follows:

A device for laminating plate-shaped articles, in particular glass panes, has two laminating rolls 2, 9, from which at least one laminating roll 2 is driven and between which the plate-shaped articles for lamination are guided. A laminating roll 2 is preferably mounted securely in a machine frame 1, and the other laminating roll 9 is mounted in an adjustable manner in the machine frame 1. The roll 9 that is mounted in an adjustable manner in the machine frame 1 is mounted in the area of its ends in bearings 11 that are connected to parallel guides 25, 26. The parallel guides 25, 26 are mounted in the machine frame 1 and are connected to one another by means of a coupling bar 32. One of the two parallel guides 25 is connected to a drive 37.

The invention claimed is:

1. Device for laminating plate-shaped articles, with two laminating rolls (2, 9) of which at least one laminating roll (2) is driven and between which the plate-shaped articles for lamination are guided, wherein one laminating roll (2) is mounted in a machine frame (1), and the other laminating roll (9) is mounted in an adjustable manner in the machine frame (1), wherein the roll (9) that is mounted in an adjustable manner in the machine frame (1) is mounted in the area of its ends in bearings (11) that are connected to parallel guides (25, 26), wherein the parallel guides (25, 26) are mounted in the machine frame (1) and are connected to one another by means of a coupling bar (32), wherein the coupling bar (32) is a tension bar, and wherein one of the two parallel guides (25) is connected to a drive (37).

2. The device according to claim 1, wherein the parallel guides (25, 26) have two legs (27, 28; 30, 31), of which the respective first leg (27, 30) is connected to the coupling bar (32) and the respective second leg (28, 31) is connected to a bearing (11) for the laminating roll (9).

3. The device according to claim 2, wherein the legs (27, 28; 30, 31) of each parallel guide extend toward one another approximately at right angles.

4. The device according to claim 2, wherein one of the parallel guides (25) has a third leg (29), on which the drive (37) engages.

5. The device according to claim 4, wherein the third leg (29) and the first leg (27) essentially lie in a line.

6. The device according to claim 1, wherein the adjustable laminating roll (9) is mounted on the machine frame (1) in a pivoting frame (10).

7. The device according to claim 1, wherein the adjustable laminating roll (9) is mounted on the machine frame (1) in a pivoting frame (10), and the respective second leg (28, 31) of the parallel guides (25, 26) is connected to the pivoting frame (10).

8. The device according to claim 6, wherein the pivoting frame (10) is mounted on the machine frame (1) via pivot bearings (12) and wherein at least one spring (21) is provided to compensate for the weight of the pivoting frame (10) and machine elements arranged on the latter.

9. The device according to claim 8, wherein the spring (21) is arranged on the pivoting frame (10) at a site opposite the pivot bearings (12).

10. The device according to claim 9, wherein the spring (21) is a tension spring or a compression spring and is mounted on holding devices (16), of which one mounting unit (17a) is arranged on the pivoting frame (10) and another mounting unit (17b) is arranged on the machine frame (1).

11. The device according to claim 1, wherein a force gauge (36) is arranged between the drive (37) and the parallel guides (26).

12. The device according to claim 6, wherein a supporting frame (3) is mounted in an adjustable manner on the machine frame (1) and wherein the pivoting frame (10) is mounted on the supporting frame (3).

13. The device according to claim 12, wherein the parallel guides (25, 26) are mounted on the machine frame (1) via the supporting frame (3).

14. The device according to claim 7, wherein the pivoting frame (10) is mounted on the machine frame (1) via pivot bearings (12) and wherein at least one spring (21) is provided to compensate for the weight of the pivoting frame (10) and machine elements arranged on the latter.

15. The device according to claim 14, wherein the spring (21) is arranged on the pivoting frame (10) at a site opposite the pivot bearings (12).

16. The device according to claim 15, wherein the spring (21) is a tension spring or a compression spring and is mounted on holding devices (16), of which one mounting unit (17a) is arranged on the pivoting frame (10) and another mounting unit (17b) is arranged on the machine frame (1).

* * * * *